(No Model.) 2 Sheets—Sheet 2.
J. R. SEVERANCE.
ENDLESS CARRIER FOR GRAIN BINDERS, &c.
No. 283,671. Patented Aug. 21, 1883.
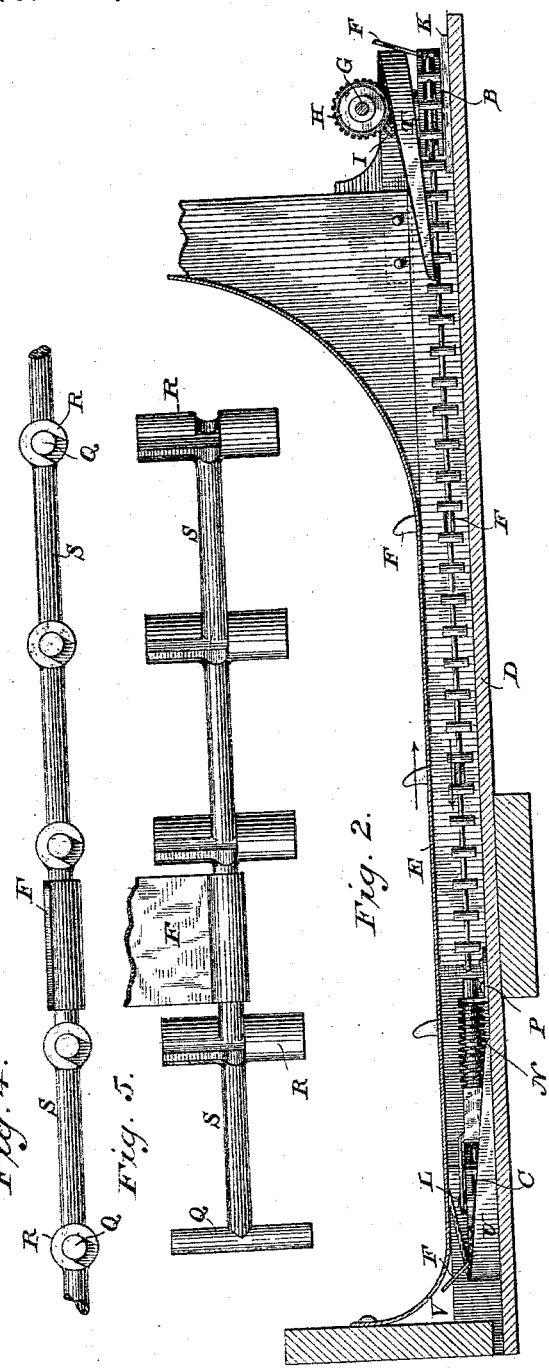
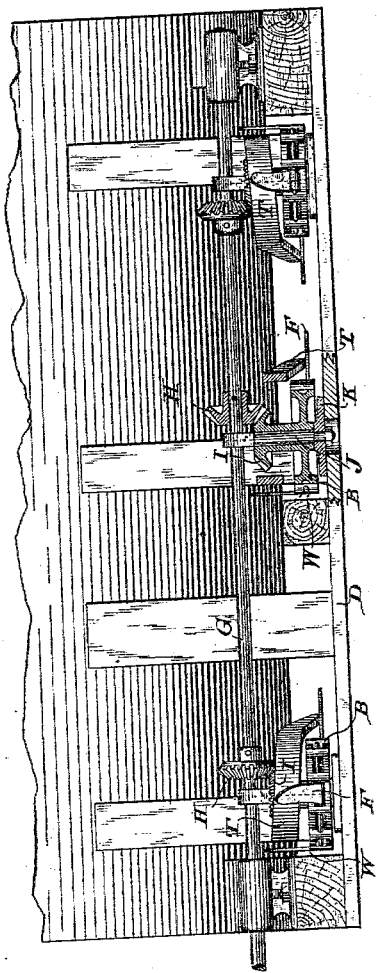
WITNESSES
Wm A. Skinkle
Geo W Young
INVENTOR
James R. Severance
By his Attorneys
Baldwin, Hopkins & Peyton

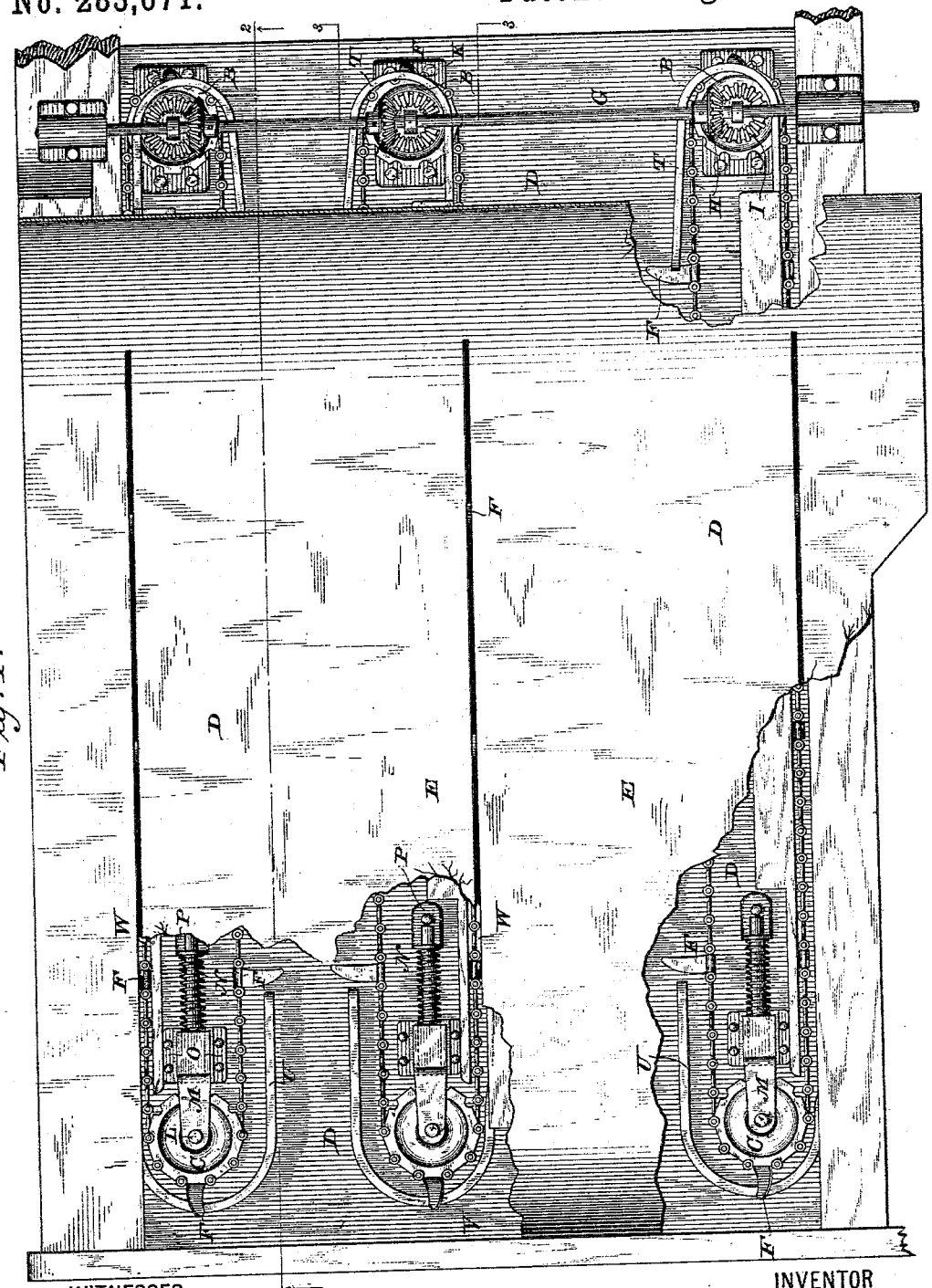

UNITED STATES PATENT OFFICE.

JAMES R. SEVERANCE, OF FREMONT, OHIO.

ENDLESS CARRIER FOR GRAIN-BINDERS, &c.

SPECIFICATION forming part of Letters Patent No. 283,671, dated August 21, 1883.

Application filed May 3, 1883. (No model.)

*To all whom it may concern:*

Be it known that I, JAMES R. SEVERANCE, of Fremont, in the county of Sandusky and State of Ohio, have invented certain new and useful Improvements in Endless Carriers for Grain-Binders and other Machines, of which the following is a specification.

My invention relates to improvements in endless carriers of the class provided with toothed chains actuated by pulleys, and which, though especially applicable to slotted platforms of grain-binders, may advantageously be adapted to use in connection with various machines for feeding grain, straw, or like material.

My object mainly is to provide simply-constructed, positively-actuated, strong, and durable endless-carrier mechanism for grain-platforms of binders, and in accordance with my improvements the chain-actuating pulleys revolve with their faces or upper sides in a plane parallel to the surface of the platform and close thereto. The chains have vibrating feeding-teeth pivoted to them, and these teeth are actuated by means which turn them into their operative position or cause them to project through the platform-slots, and also turn them, after acting on the grain, into their inoperative position, in which they are caused to project laterally to the chains and to the path of movement thereof, and to extend parallel, or nearly so, with the platform's surface while returning to the place at which they are actuated to restore them to their working position.

The subject-matter herein claimed will be particularly pointed out after describing my invention as applied to the platform of a grain-binder by the aid of the annexed drawings, in which—

Figure 1 is a plan or top view, with parts broken away, showing those parts only of suitable mechanism illustration of which is thought to be sufficient to show an appropriate adaptation of my invention. Fig. 2 is a view partly in front elevation and partly in vertical section on the line 2 2 of Fig. 1. Fig. 3 is a view partly in end elevation and partly in vertical section, as indicated by the line 3 3 of Fig. 1. Figs. 4 and 5 are views showing, on an enlarged scale, details of the construction of the endless carrier-chain and teeth.

Each carrier-chain A of the series is operated by a driving-pulley, B, and a driven pulley, C. In the organization in this instance shown there are three chains. The three driving-pulleys B are supported at the inner end or prolongation of the platform D, the three pulleys C are located at or near the outer end of the platform, and the cover or surface E of the platform is provided with slots for feeding-teeth F, which have jointed connection with the chains, so that they may be vibrated, as farther on to be explained.

The chain-driving pulleys have motion imparted to them in suitable way, as by means of a rotating driving-shaft, G, continuously driven while the machine is in action by appropriate mechanism. The driving-pulleys and the driven pulleys are mounted to rotate about vertical axes, so that their faces or upper sides are in a plane parallel with the horizontal surface of the platform. Pinions H, fast on the driving-shaft G, engage pinions I, loose on the upright shafts J of the pulleys B. As shown, each of these pulleys is formed with its pinion I, and each shaft J is secured in position by means of an eye at its upper end, through which the driving-shaft passes, and by its tenoned threaded lower end, a plate, K, and a nut.

The driven pulleys C are adjustably mounted and acted upon by springs, so as to keep the chains under proper tension. As shown, each pulley C is mounted by its shaft L in the forks of a slider or movable frame, M, acted upon by a spring, N, with a tendency to stretch the chain passing around the pulley. Each slider has projecting side ribs, which are overlapped by the edges of guideway-plates O O, serving, in connection with the perforated lug P, to hold the slider in proper position while subject to the action of its spring.

Various kinds of chain of well-known construction may be used in connection with the jointed teeth, and means for vibrating these teeth, as soon to be explained; but I prefer to employ a chain and teeth of special construction, as shown in detail in Figs. 4 and 5. The links of this chain are all alike, each being formed at one end with the cross-head pivot Q, the slotted and perforated cross-head or pivot-bearing R at the opposite end, and the connecting-bar S. The slot in the pivot-bearing end of the link is angular, of the full length of one arm of the cross-head bearing, and extends for about half the length of the bearing plus half the diameter of the connecting-bar. For its greater extent the slot is lengthwise of the bearing, and both this lengthwise portion and the lateral or intersecting portion of the slot are of a width to admit the connecting-bar.

It will readily be understood that the cross-head pivot of one link can be inserted into the cross-head bearing of another link by way of the slotted arm of said bearing, and, after being pushed home, the connecting-bar be turned so as to occupy the short or lateral portion of the slot, thus making a very strong connection of the links.

The feeding-teeth are best made of sheet metal and jointed to the chain at suitable intervals by turning them at their bases into sleeve form about the connecting-bars of the links. A free pivotal connection is thus secured.

The feeding-teeth are vibrated so that in moving inward they pass along the platform-slots and perpendicularly to the platform-surface, while in their outward movement they pass along beneath and project in a direction parallel, or nearly so, with the platform-surface, and extend laterally to the chains and to their paths of movement, thus occupying very little space and admitting of the employment of a thin platform—that is, a platform in which the space between the covering or surface and the boarding or bottom is quite shallow.

The teeth are supported while in action, are directed to the slots of the platform-surface, and are vibrated by means as follows: Fixedly-supported inclines or lifting and depressing bars are bent to pass around the pulleys B and C. The inclines T at the driving-pulleys depress the teeth, and the inclines U at the driven pulleys raise the teeth. The teeth pass first, when presented to the inclines T, beneath the supporting or shank ends of the inclines, and are positively depressed, so that in passing toward the driven pulleys the teeth extend laterally from the chains and are approximately parallel to the surface of the platform. When the inclines U are reached by the teeth, they ride upon the inclines and pass along and inside of them until elevated in the space V under the upwardly-curved outer end of the platform-surface or cover-plate, and presented to the slots of the platform-surface. While in their upright or operative position the teeth travel with their chains in guide-channels W, formed between frame-pieces of the platform.

To enable the preferred form of chains to be used to the best advantage, the driving and driven pulleys are centrally and annularly grooved on their peripheries, and provided with notches or pockets on opposite sides of these grooves, and corresponding with each other. The cross-head bearings of the links engage the pulley-pockets, and the connecting-bars of the link pass into the grooves of the pulleys, but do not bind or closely fit therein, so as to prevent the free vibration of the feeding-teeth in passing around the pulleys.

From the above description it will be understood that the grain is carried inward along the surface of the platform by the action of the carrier-teeth, that the teeth are positively vibrated into their inoperative position, return outward while projecting laterally from the chains, and are positively vibrated into their operative position.

As it is obvious that essential features of my invention may be applied to machines other than harvesters—for instance, so as to constitute straw-carrying mechanism of grain-separators—I do not wish to be understood as confining my invention herein claimed to any special application. Neither do I wish to be understood as limiting my improvements to details of construction and arrangement as particularly described and illustrated, as my invention may be modified in various respects. For instance, the driving-shaft may be located below, instead of above, the driving-pulleys, alteration be made in the form of the means by which the feeding-teeth are vibrated, the platform or slotted surface along which the grain or other material is fed be inclined or vertical, instead of horizontal, with corresponding modification in the arrangement of the pulleys, so as to cause them to rotate in a plane, whether vertical or inclined, parallel to the surface along which the material is fed, thus admitting of the feeding-teeth being carried close to said surface when they are inoperative, and providing for the movement of the chains in both directions in the same plane, and at an equal distance from and parallel with the platform or other surface along which the material is fed by the teeth.

I do not herein claim the described improvements in chains *per se*, hereby reserving the right to claim said improvements elsewhere.

I claim as of own my invention—

1. The combination, substantially as hereinbefore set forth, of the slotted platform, driving and driven pulleys rotating with their faces in a plane parallel to the platform's surface, endless chains passing around said pulleys beneath the platform's surface, and moving in both directions in the same plane and parallel to the platform's surface, pivoted feeding-teeth vibrating laterally to the chains and to their paths of movement, and means for positively vibrating the teeth, and by which they are depressed after leaving the platform-slots at their inner ends, and turned up to enter the platform-slots at the outer ends thereof, for the purpose described.

2. The combination of the slotted platform, the driving and driven pulleys rotating about vertical axes, the endless chains, the pivoted feeding-teeth vibrating laterally to the chains and to their paths of movement, the inclines for turning up the teeth and the inclines for depressing the teeth, substantially as and for the purpose hereinbefore set forth.

In testimony whereof I have hereunto subscribed my name.

JAMES R. SEVERANCE.

Witnesses:
H. S. BUCKLAND,
J. M. BELL.